United States Patent [19]

Fonseca

[11] 3,979,265
[45] Sept. 7, 1976

[54] RECOVERY OF METALS FROM SULFUR BEARING ORES

[75] Inventor: Anthony G. Fonseca, Ponca City, Okla.

[73] Assignee: Continental Oil Company, Ponca City, Okla.

[22] Filed: Dec. 19, 1974

[21] Appl. No.: 534,324

[52] U.S. Cl. .............................. 204/105 R; 204/107; 204/108; 204/109; 204/111; 204/113; 204/117; 204/118; 204/128; 75/101 R; 75/117; 75/118 R; 75/119; 75/120; 75/121; 423/22; 423/32; 423/35; 423/42; 423/104; 423/109; 423/140; 423/511

[51] Int. Cl.$^2$.................... C25C 1/12; C25C 1/08; C25C 1/16; C25C 1/20

[58] Field of Search ................ 75/101 R; 75/101 R, 75/103, 117, 118, 119, 108, 121, 120, 114; 423/511, 140, 38, 22; 204/105 R, 107, 108, 106, 128, 113, 117–118, 111

[56] References Cited
UNITED STATES PATENTS 3,673,061  6/1972  Kruesi........................ 204/105 R
3,736,238  5/1973  Kruesi et al.................. 204/105 R

OTHER PUBLICATIONS

"Chlorination of Sulfide Ores with Chlorine in a Medium Containing Liquid Chlorine," by N. S. Fortunatov et al., Ukrainskii Khimicheskii Zhurnal, Apr. 1966, 32, 406–411.

Primary Examiner—R. L. Andrews
Attorney, Agent, or Firm—Richard W. Collins

[57] ABSTRACT

Sulfur monochloride is reacted with an ore containing iron, sulfur and a metal which forms a water soluble ammine complex or an ammonium-containing double salt, to yield metal chlorides and sulfur. The metal sought is solubilized with an aqueous solution containing ammonium ions to produce an aqueous solution of metal ammine complex or double salt and thereby separate such complex or salt from the iron and sulfur. The solution containing the sought metal values can then be subjected to electrowinning to recover the metal, or the metal can be precipitated as the metal oxide by the addition of sodium hydroxide. Sulfur and chlorine are recovered during the process and used to regenerate sulfur monochloride.

13 Claims, 2 Drawing Figures

RECOVERY OF METALS FROM SULFUR BEARING ORES

BACKGROUND OF THE INVENTION

1. Field of the Invention

This invention relates to the recovery of certain metals from iron and sulfur-containing ores, and more particularly, though not by way of limitation, to the recovery of copper from chalcopyrite.

2. Brief Description of the Prior Art

Copper is currently most often recovered from chalcopyrite and other sulfur-containing ores by pyrometallurgy techniques, such as smelting. This method is also used for the recovery of other metals from some sulfur-containing ores. Such procedure results in undesirable air pollution from the sulfur dioxide produced in the process. In order to rectify this problem, various hydrometallurgical methods have been proposed, including that described by Haver and Wong in 1971 in which chalcopyrite is treated with aqueous ferric chloride to solubilize copper salts from which the copper is subsequently recovered by either electrochemical or cementation methods. Cupric chloride and hydrochloric acid have also been proposed as leaching reagents. In general, the hydrometallurgical methods as previously proposed have been long and cumbersome, and generally do not use a closed loop process in which all the reactants employed, including that utilized for solubilization of the metal values from the ore, are regenerated and recycled in the course of the process.

BRIEF DESCRIPTION OF THE PRESENT INVENTION

This invention provides a closed loop process for recovering certain metals which form either water soluble ammine complexes or ammonium-containing double salts from ores or raw materials containing such metals, iron and sulfur. The metal-containing raw material is initially treated with sulfur monochloride to yield sulfur and the chlorides of the metal and iron. The reaction products are slurried in an aqueous solution containing ammonium ions to dissolve the metal values as water soluble ammine complexes or ammonium-containing double salts, and leave residual solid sulfur. By adjustment of the pH of the aqueous solution to a value above about 3.0, the iron hydroxides formed are precipitated and separated from the aqueous solution with the sulfur.

The aqueous solution of the ammine complex or double salt can then be treated with sodium hydroxide to precipitate the metal as the oxide, or the metal can be recovered by electrowinning. In the latter case, the metal is removed at the cathode and chlorine is removed at the anode. The chlorine is combined with the sulfur produced in the ore solubilization to regenerate sulfur monochloride for recycling to the ore treatment step.

An important object of the invention is to provide a closed loop process by which ores containing certain metals and sulfur, or other raw materials which contain sulfur and such metals, and specifically, metals which form water soluble ammine complexes or double salts when treated with an aqueous solution containing ammonium ions, can be treated to recover these metals in relatively high purity and with good efficiency.

A further, more specific, object of the invention is to provide a procedure by which chalcopyrite ore may be treated to recover the copper content thereof, utilizing an economical closed loop process by which the reactants employed are regenerated in the course of the process and are recycled for repeated usage.

An additional object of the invention is to provide a process for leaching ores and other raw materials which contain sulfur in addition to certain metals, and then subjecting the pregnant leach solution to treatment to separate such metals from elemental sulfur in a way facilitating the ultimate recovery of each in useful form.

In addition to the foregoing described objects and advantages, additional objects and advantages of the invention will become apparent as the following detailed description of certain preferred embodiments of the invention is read in conjunction with the accompanying drawings which illustrate such preferred embodiments.

GENERAL DESCRIPTION OF THE DRAWINGS

DETAILED DESCRIPTION OF PREFERRED EMBODIMENTS OF THE INVENTION

The starting material utilized in the invention is an ore or other raw material which contains, in addition to sulfur and iron, certain metal values to be recovered. The metals which are recovered by the process of the invention are those in Periodic Table Group VIII, with the exception of iron, and in Groups IB and IIB. These metals include cobalt, nickel, copper, zinc, cadmium, silver, paladium, rubidium, osmium, iridium, platinum, gold and mercury. The metals which are of predominant interest in the practice of the present invention are copper, nickel and cobalt.

Figure 1:
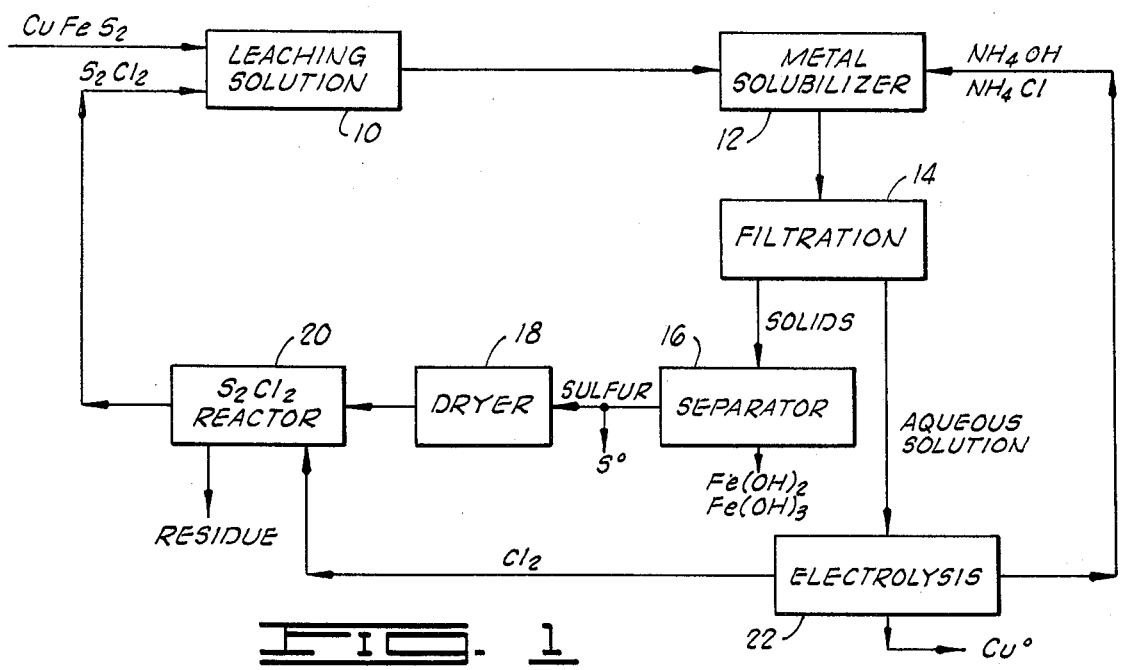
FIG. 1 is a process flow diagram illustrating one embodiment of the invention in which a closed loop process is employed to recover a metal from a sulfur-containing ore. The process flow diagram is based upon a typical recovery of copper metal from chalcopyrite ore.
Figure 2:
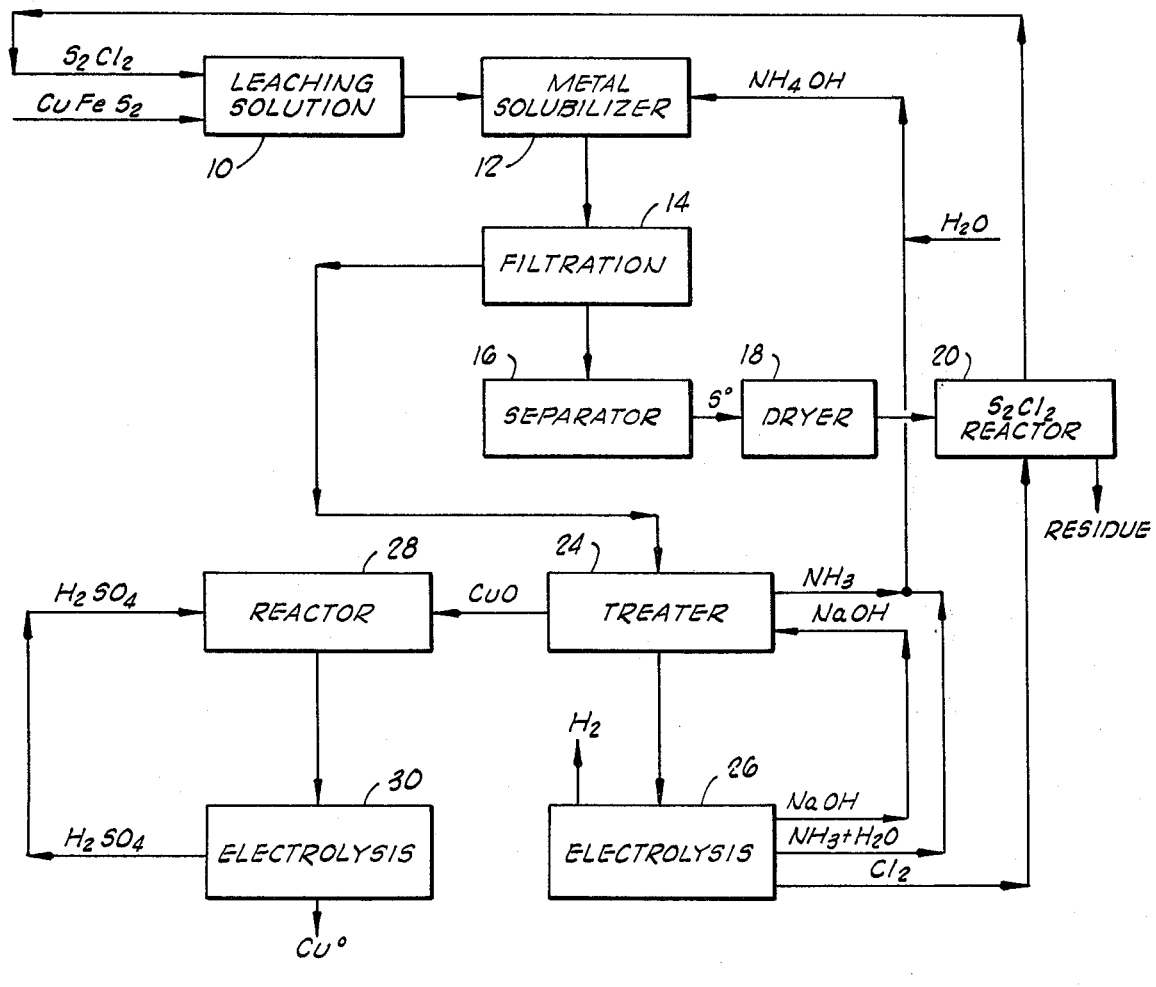
FIG. 2 is a process flow diagram of a different embodiment of the invention, also illustrating by way of example, the recovery of copper from chalcopyrite.

The initial step of the process is illustrated diagrammatically in FIGS. 1 and 2 of the drawings, and entails the leaching of the ore containing the metal to be recovered, iron and sulfur, in a leaching reactor 10, using sulfur monochloride ($S_2Cl_2$) as the leaching agent. For purposes of illustration, chalcopyrite ($CuFeS_2$) is shown being charged to the leaching reactor 10 with the sulfur monochloride. Other iron and sulfur-containing ores, such as pentlandite, can also be subjected to the process of the invention. The amount of the sulfur monochloride which is utilized in the leaching step is an amount sufficient to oxidize all of the sulfide ion present in the ore to elemental sulfur, or, stated differently, is one mole of sulfur monochloride per mole of sulfide ion present in the ore charged to the leaching reactor. Additionally, the quantity of sulfur monochloride utilized should be stoichiometrically sufficient to convert any of the desired metal species present in the ore, and the bound iron therein, to the chlorides of such metal and iron. In the case of chalcopyrite, this will be two moles of the sulfur monochloride per mole of cupric ion present. The occurring reaction, in the case of chalcopyrite, may be written as

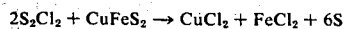

$$2S_2Cl_2 + CuFeS_2 \rightarrow CuCl_2 + FeCl_2 + 6S$$

The leaching of the ore can be carried out over a wide range of temperatures and pressures. The temperature, for example, can range from about −30°C to about 160°C. Preferably, a temperature of from about 20°C to about 138°C (the boiling point of the sulfur monochloride) is utilized. With many types of ores, such as chalcopyrite, the reaction is exothermic and results in rapid heat evolution. It is therefore generally preferred to carry out the reaction in a sealed reaction system, concurrently providing external cooling to maintain the reaction rate at a controlled, optimum value. In instances where the reaction is carried out above the boiling point of the sulfur monochloride, it is also desirable to carry out the reaction in a sealed vessel or system in order to prevent loss of the leaching agent due to volatilization.

The product formed in the leaching reactor 10 is a slurry in which the metal chlorides formed (including ferrous chloride and the chloride of the metal to be recovered), along with solid elemental sulfur, are slurried in excess sulfur monochloride. The slurry is charged to a metal solubilizer 12 in which the slurry is thoroughly mixed with an aqueous solution containing ammonium ions.

The ammonium ions are present in an amount sufficient to form an ammine complex of the metal to be recovered, or to form a double salt containing the ammonium ion, depending upon the pH of the aqueous solution. The aqueous solution further contains hydroxyl ions in a quantity sufficient to convert the ferrous chloride present in the slurry of the leaching reactor to ferric and ferrous hydroxides, and to concurrently maintain the pH of the aqueous solution at a value above about 3.0 so that the iron hydroxides are insoluble in the aqueous solution, thus facilitating their separation from the solution along with the solid elemental sulfur. The pH of the aqueous treating solution used in the metal solubilizer 12 can be made as high as about 12.5, and the particular pH employed will depend upon the subsequent treatment of the aqueous solution filtrate from the metal solubilizer 12. Such subsequent processing may be carried out in either of two ways hereinafter described.

The preferred treating solution employed in the metal solubilizer 12 is an aqueous solution containing hydroxyl ions and ammonium chloride in a sufficient quantity to provide the ammonium needed for complexing or double salt formation, and also to buffer the solution to the desired pH. Most desirably, the aqueous solution contains ammonium ions in excess of those derived from the ammonium chloride, resulting in the ionization of the ammonium hydroxide formed to produce free hydroxyl ions in an amount which, considering the buffering action of the ammonium chloride, results in an aqueous solution having a pH of selected value between about 3.0 and about 12.5.

Treatment with the ammonium ion containing solution converts the chloride of the metal to be recovered to an ammine complex containing the metal, or to an ammonium-containing double salt of the metal. Each of these are water soluble, and by pre-adjusting the pH of the treating solution to above 3.0, the iron chlorides present are converted to insoluble hydroxides. These remain in the solid residue with elemental sulfur following removal of the aqueous solution containing the complex or double salt. Contact between the ammonium ion-containing solution and the slurry from the leaching reactor 10 is preferably carried out in the metal solubilizer 12 with agitation to promote intimacy of contact. Following the reaction, the mixture is allowed to remain quiescent to allow the iron hydroxides and elemental sulfur to settle out, or the reaction mixture may be subjected to filtration, centrifugation or other suitable separatory technique. In the typical process illustrated in the drawings, the reaction mixture is passed from the metal solubilizer 12 to a filtration zone 14 where the solids (sulfur and iron hydroxides) are separated from the aqueous solution containing the solubilized metal values.

From the filtration zone 14, the solid residue is directed to a separator 16 for the purpose of separating the metallic sulfur from the hydroxides of iron. This can be accomplished in several ways, including separation by melting or burning of the sulfur to produce sulfur-containing gases. In yet another separatory technique, the sulfur can be extracted from the remainder of the solid residue by contacting the residue with carbon disulfide, benzene or other solvent in which the elemental sulfur is soluble. In the closed loop process which is characteristic of the preferred practice of this invention, however, separation is preferably effected by flotation. Using selected flotation processing and reagent selection will allow the sulfur to be separated from the iron containing solids. Following separation, the recovered solid sulfur is preferably directed through a dryer 18 to remove any residual moisture. It is then introduced to a sulfur monochloride reactor 20 where it is reacted with chlorine in a manner hereinafter described to regenerate the sulfur monochloride leaching agent. Since all of the sulfur yielded by the process is not required to regenerate the needed amount of sulfur monochloride leaching agent, the excess yield of sulfur can be removed, as shown, upstream from the dryer 18.

The filtrate from the filtration zone 14 may be processed for the recovery of the metal values therefrom in one of two alternate ways illustrated, respectively, in FIGS. 1 and 2. In one of these, immediately hereinafter described, the aqueous solution is subjected to electrowinning to recover the metal therefrom, and to regenerate certain of the reactants employed in the process. In the other alternative mode of treatment, the aqueous solution is passed to a treater where the aqueous solution is treated with sodium hydroxide to precipitate as the oxide, the metal value to be recovered. The metallic oxide is then subjected to subsequent processing to recover the pure metal.

Considering first, the embodiment of the invention which entails electrowinning, the aqueous solution containing the metal values to be recovered is passed to an electrolysis zone 22. Prior to such passage, however, and preferably in the metal solubilizer 12, the pH of the aqueous solution has been adjusted to a value of from about 3.0 to 7.0 so that the electrolysis can be carried out. Treatment of the slurry from the leaching reactor 10 to yield a solution having this pH results in the formation of a double salt containing ammonium ions and ions of the metal to be recovered. The aqueous solution of the salt forms the electrolyte in the electrolysis zone 22.

In the electrolysis zone 22, the free metal which is to be recovered is formed at the cathode, which can be copper, stainless steel, platinum or other suitable materials conventional and well known in the art. Chlorine is liberated at the anode, which can typically be a graphite electrode, and is passed to the sulfur monochloride reactor 20. In the sulfur monochloride reactor 20, free sulfur in boiling sulfur monochloride is contacted by the chlorine gas. The free sulfur reacts with the chlorine gas to produce an excess or net yield of additional suflur monochloride, and this material can then be recycled to the leaching reactor 10.

The electrolyte in the electrolysis zone 22 is converted by the electrolysis to an ammonium ion-containing aqueous treating solution of the type previously described, which, in the illustrated, exemplary embodiment, is an aqueous solution of ammonia and ammonium chloride. This solution can then be recycled from the electrolysis zone 22 to the metal solubilizer for solubilizing additional copper metal from the slurry reaction product yielded in the chalcopyrite leaching reator 10.

In an alternative embodimemt of the invention, the ammonium ion-containing solution utilized for solubilizing the metal values is adjusted in its pH to have a value after solubilization of the metal values of between 7 and 12.5. Since at this pH no buffering against hydroxyl ions is needed, an ammonium hydroxide solution containing no ammonium chloride is utilized as the solubilizing agent. When the relatively high pH solution described is used, an aminne complex of the metal to be recovered is formed, as contrasted with the double salt previously described as formed in acid pH solutions. The ammine complex-containing aqueous solution is charged to a treater 24 where the aqueous solution is treated with sodium hydroxide. The reaction mixture in the treater 24 is preferably heated during treatment to drive off some of the free ammonia which can then be solubilized in water for recharging to the metal solubilizer 12. The sodium hydroxide treatment results in precipitation from the solution of metal oxide, which, in the case of the illustrated chalcopyrite starting material is, of course, cupric oxide.

The solution which is produced in the treater 24 by the sodium hydroxide treatment is an aqueous solution of sodium chloride and ammonium chloride. This solution is charged to an electrolysis zone 26 where, by conventional brine cell technology well known in the art, hydrogen is produced at the cathode and chlorine is liberated at the anode. The chlorine is recycled to the sulfur monochloride reactor 20 where it reacts with the free sulfur in the presence of the boiling sulfur monochloride to yield net sulfur monochloride which is recycled to the leaching reactor 10. The electrolyte developed in the brine cell employed in the electrolysis zone 26 can be separated into portions which are relatively concentrated sodium hydroxide and trace amounts of ammonium hydroxide solution. The sodium hydroxide solution is recycled to the treater 24 and the ammonia solution is recycled to the metal solubilizer 12.

The metal oxide precipitated in the treater 24 is charged to a reactor 28 where the metal oxide is reacted with sulfuric acid to produce a solution containing the metal sulfate. The metal sulfate solution is directed to an electrolysis zone 30 and is there subjected to electrowinning in which, in the example involving a chalcopyrite starting material, copper is recovered at the cathode and sulfuric acid is regenerated. Since in copper recovery, one equivalent of the metal is generated for each equivalent of acid, the system lends itself to a closed circuit, and the regenerated sulfuric acid can be recycled, without significant loss, to the reactor 28.

It will be perceived from the foregoing discussion that the process of the present invention provides a closed loop system in which the reactants needed in carrying out the process, by either of the two alternate embodiments of the invention described, are regenerated and can be recycled with little need for makeup reactant over extended periods of time. The process enables sulfur and iron-containing ores to be effectively leached, and the leach slurry produced then treated to isolate from the metal values to be recovered, elemental sulfur and undesirable iron compounds.

The following examples are illustrative of typical practice of the invention. It will be understood that the specific process conditions set forth in the examples are not intended to be limiting or restrictive with respect to the scope of the invention.

EXAMPLE 1

An amount of 11 grams of chalcopyrite (0.06mole of copper metal) was mixed with 21 grams of sulfur monochloride (0.15mole). The mixing of the ore with the sulfur monochloride was carried out at $-60°$ C to prevent any reaction from occurring before intimate mixing and addition of all of the treating solution were achieved. The reaction mixture was then sealed and heated to 100°C for a period of 1 hour to insure complete reaction. Following this time, the reaction products were slurried with approximately 100 ml of an aqueous solution containing about 22.5 grams of ammonia and 12.5 grams of ammonium chloride. This solution had an initial pH of about 11.0. An exothermic reaction occurred in which the copper chloride salts were dissolved in the aqueous solution as double ammonium salts and the pH of the sodium dropped to about 6.0.

Upon filtration, 93 per cent of the soluble copper from the pregnant leach solution was recovered. Additional washing of the residue recovered essentially all of the contained copper; the copper being present in this first filtrate in a concentration of 22 grams per liter. The solid residue remaining after the aqueous ammonium hydroxide-ammonium chloride treatment weighed 15.5 grams. X-ray analysis of the residue showed that sulfur was the only crystalline component present. The sulfur content of the solid residue was 59.4 per cent. Sulfur present in the residue as sulfide was less than 5 ppm. The copper content of the residue remaining after the double salt formation and solubilization was 4.96 weight per cent. A portion of the residue was shaken with carbon disulfide which easily removed the elemental sulfur, leaving hydrous iron hydroxide compounds.

The copper double salt-containing aqueous solution was subjected to electrolysis to remove the copper from the solution by plating it upon a copper anode. Chlorine was evolved at a graphite anode.

EXAMPLE 2

100 grams of a pentlandite ore of the composition $(Ni,Fe)_9S_8$ are mixed with 175 grams of sulfur monochloride at a temperature of 20°C in a closed vessel provided with external cooling to prevent the temperature of the reaction mixture from exceeding 80°C as the reaction proceeds. After 45 minutes, the reaction product slurry, separated from undigested ore, is mixed with 450 ml of an ammonium hydroxide solution having a pH of 11.5. Substantially all of the nickel is solubilized as a nickel-containing ammine complex.

Although certain process parameters and conditions have been alluded to herein as the specification describes certain exemplary embodiments of the invention, it will be understood that such materials and reactants employed can be varied to some extent from those which are identified and discussed without departure from the basic principles underlying the invention. Changes and innovations of this type are therefore deemed to be circumscribed by the spirit and scope of the invention, except as the same may be necessarily limited by the appended claims or reasonable equivalents thereof.

What is claimed is:

1. A process for recovering certain metals which form water-soluble ammonium-containing compounds, from raw materials comprising an ore containing said certain metals in a form leachable with sulfur monochloride and also containing iron and sulfur in a form leachable with sulfur monochloride, comprising:

leaching the raw material with sulfur monochloride at a temperature of from about −30° to about 160°C to remove therefrom as chlorides, the metal to be recovered and iron, and to remove elemental sulfur therefrom;

solubilizing the metal values to be recovered by contacting said chlorides and sulfur with an aqueous solution containing ammonium ions and having a pH of at least about 3 whereby said iron chlorides are converted to iron hydroxides and precipitated; then recovering the metal values from the aqueous solution by an electrowinning process or by precipitating the metal values as metal oxide.

2. The process defined in claim 1 wherein the metal is recovered from the aqueous solution by an electrowinning process.

3. The process defined in claim 2 wherein the metal values are solubilized by contacting the chlorides and sulfur with an aqueous ammonium hydroxide solution of ammonium chloride having a pH adjusted to yield a solution of the metal values having a pH of less than 7.

4. The process defined in claim 3 wherein said electrowinning process comprises:
liberating chlorine gas at an anode; and
depositing said metal at a cathode.

5. The process defined in claim 4 and further characterized as including the steps of:

contacting the chlorine gas, in the presence of boiling sulfur monochloride, with sulfur remaining as a residue after said solubilization to generate sulfur monochloride, and
recycling the generated sulfur monochloride to the zone in which the raw material is leached.

6. The process defined in claim 5 wherein the leaching of the raw material is carried out at a temperature of from about 20° to about 130°C.

7. The process defined in claim 2 wherein said electrowinning process comprises:
liberating chlorine gas at an anode; and
depositing said metal at a cathode.

8. The process defined in claim 1 wherein the metal is recovered from the aqueous solution by:
adding sodium hydroxide to said aqueous solution to precipitate the metal as the oxide; then
converting the metal oxide to elemental metal.

9. The process defined in claim 8 wherein the metal values are solubilized by contacting the chlorides and sulfur with an ammonium hydroxide solution having a pH adjusted to yield a solution of the metal values having a pH between 7 and about 12.5.

10. The process defined in claim 8 wherein the metal oxide is converted to elemental metal by contacting the oxide with sulfuric acid to form a metal sulfate solution; then
subjecting the metal sulfate solution to electrowinning to recover the metal therefrom.

11. The process of claim 1 and further characterized as including the steps of:
applying an electrolysis current to the aqueous solution to generate chlorine gas;
recovering chlorine gas from the aqueous solution from which the metal is recovered following solubilization;
contacting the chlorine gas, in the presence of boiling sulfur monochloride, with sulfur remaining at a residue after said solubilization to generate sulfur monochloride; and
recycling the generated sulfur monochloride to the zone in which the raw material is leached.

12. The process defined in claim 1 wherein said raw material is chalcopyrite ore.

13. The process defined in claim 1 wherein the leaching of the raw material is carried out at a temperature of from about 20° to about 130°C.

* * * * *